3,127,441
PROCESS FOR MAKING SUBSTITUTED DIPHENYL
ETHER SULFONATES
Joseph C. Valenta and Alfred F. Steinhauer, Midland,
Mich., assignors to The Dow Chemical Company, Midland, Mich., a corporation of Delaware
No Drawing. Filed Nov. 17, 1960, Ser. No. 69,799
8 Claims. (Cl. 260—512)

This invention relates to a new and improved process for making substituted diphenyl ether sulfonates. It relates more specifically to an improved process for making sulfonates of the general formula:

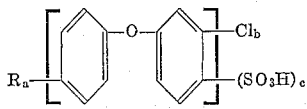

wherein R is alkyl, $a$ is a number from 1–2, the total number of alkyl carbon atoms in the molecule being 8–18, $b$ is a number from 0–1, and $c$ is a number from 1–2.

These compounds are ordinarily used in the form of salts which are made by adding an equivalent amount of a base to a solution of the sulfonic acid. Commonly, these salts are the sodium salts. These salts are surface-active agents well-known as having a wide range of useful applications. They are particularly characterized by their solubility and effectiveness in concentrated aqueous solutions of electrolytes.

A known process for the preparation of these sulfonates involves the reaction of a sulfonating agent such as sulfur trioxide or chlorosulfonic acid with a substituted dephenyl ether, the reaction being carried out in a polychlorinated aliphatic hydrocarbon solvent solution. The sulfonated product of the reaction is soluble in the chlorinated hydrocarbon solvent and must be extracted from it with water. A base, usually sodium hydroxide, is added to the water extract to make the salt, and the salt is obtained dry or as a concentrated solution by evaporating all or part of the water. The chlorinated solvent layer contains water from the water extraction and must be dried before being reused in the process.

We have discovered an improved process for making substituted diphenyl ether sulfonates whereby the product is more easily separated from the reaction mixture, and the water extraction, the evaporation of water from the salt solution to obtain a concentrated solution, and the drying of the recovered solvent all are unnecessary. We accomplish this by using as a solvent for the sulfonation a liquid saturated aliphatic hydrocarbon. Other advantages are obtained by using our improved process and these will become apparent in the more detailed description which follows.

Our improved process, briefly, comprises dissolving the substituted diphenyl ether in a saturated aliphatic hydrocarbon solvent and sulfonating the ether by adding either chlorosulfonic acid or sulfur trioxide as the sulfonating agent. Normally, aliphatic hydrocarbons, particularly those containing secondary or tertiary carbon atoms because of branching of the carbon chain, are sulfonated under these conditions, especially by sulfur trioxide. We have found, however, that under the conditions of our process, the substituted diphenyl ether is sulfonated preferentially and exclusively, leaving the hydrocarbon solvent unaffected.

In the preferred mode of operating our process, the sulfonation is carried out by passing into the hydrocarbon-ether solution a gaseous mixture of sulfur trioxide and an inert gas. When sufficient sulfur trioxide has been introduced and has reacted, the sulfonated product, being insoluble in the hydrocarbon solvent, forms a separate lower layer in the reaction mixture. The supernatant hydrocarbon layer may be decanted or drawn off to recover substantially all of it, dry and reusable as such in the process. The lower sulfonate layer may then be reacted with a base in water sufficient to make an aqueous salt solution of a concentration suitable for commercial use. If a dry product is desired, there is less water to be evaporated than is the case in the aforementioned old process.

Liquid chlorosulfonic acid may also be used as the sulfonating agent. A product comparable to that from the sulfur trioxide sulfonation is obtained and the hydrocarbon solvent is recoverable as described above.

We have found that by our improved process a product can be made which is equal or superior to the product of the chlorinated solvent process in detergency and solubility values. This is particularly true for the preparation of alkylated diphenyl ether disulfonates and our process is most advantageous when used for the production of these compounds. Typical values for the properties of such a disulfonate thus produced are listed in the table following Example 1.

Saturated aliphatic hydrocarbons suitable for use as solvents in our process include those containing from four to about twenty carbon atoms in the molecule. Those having from five to eight carbon atoms in the molecule are particularly suitable. Hexane is a preferred solvent, particularly hexane-rich mixtures commercially available from petroleum refining processes. These limits of 4–20 carbon atoms per molecule are practical rather than theoretical. With hydrocarbon solvents of molecular weight and boiling point lower than those of butane, process difficulties caused by the necessary pressure or refrigeration or both become excessive, although propane, for example, is operable in the process. When the solvent is a hydrocarbon having more than eighteen or twenty carbon atoms in the molecule, solvent removal from the product becomes a difficult problem. Higher melting points of these higher hydrocarbons also require higher reaction temperatures which may be disadvantageous.

The amount of hydrocarbon solvent preferred in our process is about six to ten volumes to one volume of diphenyl ether. More or less solvent than this amount may be used. However, use of more solvent decreases the productive capacity of the reactor, and use of substantially less solvent may tend to increase tar formation and yield product of poorer color. Use of less solvent also makes reaction temperature control more difficult. The preferred volume ratio of about 6–10 volumes to one is about that used in the chlorinated solvent process. Because of the difference in specific gravities of these two types of solvent, only about half as much by weight of hydrocarbon solvent is required as compared to methylene chloride, for example, for any given volume. Since saturated aliphatic hydrocarbon solvents are much cheaper on a weight basis than chlorinated solvents, it is readily seen that the economic advantage of the former is considerable.

Reaction temperatures of 0–20° C. are preferred. Higher temperatures, to 50° C. for example, are operable but yield products of higher color. Temperatures lower than 0° C. can be used but are inconvenient because of the high viscosity of the separated substituted diphenyl ether sulfonate at these temperatures makes handling difficult and the necessary added refrigeration increases the cost of the process. These lower temperatures also cause trouble from sulfur trioxide freezing out in the inlet line when that is used as the sulfonating agent. It is advantageous to operate below the boiling point of the solvent to avoid excessive loss of solvent.

The preferred ratio of reactants is from about the theoretical equivalent amount to about 30% in excess of that amount of the sulfonating agent in relation to the substituted diphenyl ether. Thus, when a monosulfonated product is being made, 1–1.3 moles of sulfonating agent is used per mole of ether. Similarly, 2.0–2.6 moles of sulfonating agent per mole of ether is preferred when making a disulfonate.

When sulfur trioxide is used for the sulfonation, an inert gas unreactive in the process may be used as a carrier and diluent. A suitable and preferred gas is nitrogen. The volume of inert gas required is at least that required to prevent condensation of the sulfur trioxide at the temperature of the gas mixture. For example, this minimum volume is one liter of inert gas for about 2.7 grams of sulfur trioxide at a temperature of 30° C.

Our process is adaptable to both batchwise and continuous methods of operation. A batchwise process for making an alkylated diphenyl ether disulfonate, for example, may be carried out by dissolving one volume of alkylated diphenyl ether in from about six to about ten volumes of hydrocarbon solvent in a suitable reaction vessel. The solution is adjusted to a temperature of 0–50° C. and either liquid chlorosulfonic acid is added or a gaseous mixture of sulfur trioxide vapor and inert gas in a proportion of 1–3 g. sulfur trioxide per liter of inert gas, is passed into the hydrocarbon-ether solution at 0–50° C. with stirring, until a total of 2.0 to about 2.5 moles sulfonating agent per mole of alkylated diphenyl ether has been added, the rate of addition being adjusted to approximately the rate of reaction. After addition is complete, stirring is continued for a short time to ensure substantially complete reaction, and the reaction mixture is then allowed to settle for a few minutes. The supernatant hydrocarbon layer can then be decanted and the remaining disulfonic acid layer is neutralized with aqueous sodium hydroxide.

A continuous process may be operated in any of several ways. For example, when using a gaseous mixture containing sulfur trioxide for the sulfonation, the reaction may be carried out in a column of appropriate design wherein the gaseous sulfonating mixture is passed upward, countercurrent to the downward flow of a hydrocarbon-ether solution, the flow rates, reaction component ratios, and temperature all being as set forth above. Alternately, if liquid chlorosulfonic acid is used as the sulfonating agent, the acid and the hydrocarbon-ether solution may be metered into a reactor tube or coil of appropriate proportions, with the sulfonation reaction taking place therein. In either case, the sulfonated solution passes from the reactor to a settling tank from which the separated bottom layer, comprising the sulfonated product, is drawn off and neutralized with aqueous sodium hydroxide. The top layer, consisting essentially of hydrocarbon solvent, can be recycled directly to the reactor with added ether.

Our process may be run at approximately atmospheric or at superatmospheric pressure. Preferably, it is carried out at or about atmospheric pressure.

*Example 1*

A solution of 36.4 g. (0.1 g. mole) dodecyl diphenyl ether in 300 cc. hexane was put in a one l. flask equipped with stirrer, condenser, thermometer, and vapor inlet tube extending below the surface of the liquid. To the vapor inlet tube was connected a vaporization flask containing sulfur trioxide which in turn was connected to a source of dry nitrogen. Heat was applied to the vaporization flask and the sulfur trioxide vapors were flushed over into the reaction flask with dry nitrogen, the temperature of the reaction mixture being maintained at 10–20° C. Addition of 17.6 g. (2.2 g. moles) sulfur trioxide in this manner was completed in 15 minutes and the reaction mixture was then stirred an additional 15 minutes. The stirrer was stopped and the reaction mixture was allowed to stand 10 minutes, whereupon the mixture separated into two distinct layers. The upper layer was decanted and amounted to 298 cc., essentially pure hexane, suitable for reuse as such in the process. The sulfonated product in the reaction flask was diluted with 40 cc. water and this solution was neutralized to about pH 8 with 18.0 g. 50% sodium hydroxide. A clear amber liquid containing 58.0 g. disodium dodecyl diphenyl ether disulfonate in 50 percent solution was obtained. This solution has the following properties as compared with the average properties of some samples prepared by a process using methylene chloride as a solvent:

| Property | Hexane Solvent | $CH_2Cl_2$ Solvent |
|---|---|---|
| Solubility, 1% in 20% $CaCl_2$ | Clear solution | Clear solution. |
| Solubility, 1% in 20% NaOH | do | Do. |
| Surface tension [1] | 29.4 dynes/cm | 33 dynes/cm. |
| Interfacial tension [2] | 1.6 dynes/cm | 4.8 dynes/cm. |
| Wetting time [3] | 1.01 min | 1.0 min. |

[1] 0.1% aqueous solution at 25° C.
[2] 0.1% aqueous solution—mineral oil at 25° C.
[3] Determined similarly to Draves-Clarkson sinking time test.

*Example 2*

A run was made as in Example 1 using as solvent the recovered hexane from that run with a very small amount of fresh hexane added to replace that lost. The final product was equal in quality to that obtained in Example 1. The decanted hexane was suitable as such for reuse.

Disulfonation runs following the procedure of Example 1 were made using pentane, octane, dodecane, and refined kerosene as solvents. Products with properties similar to those of the product of Example 1 were obtained. Solvent recoveries were as follows (based on 300 cc. used):

|  | Cc. |
|---|---|
| Pentane | 270 |
| Octane | 290 |
| Dodecane | 295 |
| Kerosene | 289 |

*Example 3*

A solution of 36.4 g. dodecyldiphenyl ether in 300 cc. octane was put in a one l. flask equipped with stirrer, thermometer, condenser, and dropping funnel. To this solution was added dropwise 34.8 g. chlorosulfonic acid over a period of 15 minutes, the temperature of the reaction mixture being held at 8–18° C. by means of a water bath. Stirring was continued for 15 minutes after the chlorosulfonic acid had been added. The reaction mixture was allowed to settle and the upper octane layer was decanted, 270 cc. essentially pure octane being recovered. Aqueous sodium hydroxide was added to the bottom disulfonic acid layer remaining in the flask to a pH of 7.8. An additional 27 cc. octane was recovered from the aqueous solution. The solution was evaporated to dryness, leaving the disodium dodecyldiphenyl ether disulfonate as a buff to white powder having solubility and other properties similar to those of the product from Example 1.

*Example 4*

A solution of 37.3 g. dodecylchlorodiphenyl ether in 300 cc. hexane was put in a one l. flask equipped as described in Example 1. By the means described in Example 1, a sulfur trioxide-nitrogen gaseous mixture containing 10.4 g. sulfur trioxide was passed into the hexane solution at 10–20° C. over a period of 20 minutes. Stirring of the reaction mixture at 10–20° C. was continued for another 20 minutes after the sulfur trioxide addition was completed. The layers in the reaction mixture separated cleanly and 270 cc. hexane was recovered. The monosulfonated lower layer was neutralized to pH 9.0 with aqueous sodium hydroxide. The resulting sodium salt had solubility and detergent properties similar to those of sodium dodecylchlorodiphenyl ether monosulfonate prepared by the methylene chloride solvent process.

We claim:

1. A process for making substituted diphenyl ether sulfonates of the general formula:

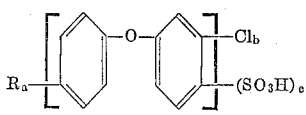

wherein $a$ is a number from 1–2, R is alkyl and the total number of alkyl carbon atoms in the molecule is 8–18, $b$ is a number from 0–1, and $c$ is a number from 1–2, which process comprises contacting a substituted diphenyl ether dissolved in a liquid saturated aliphatic hydrocarbon solvent with at least about the theoretical amount of a sulfonating agent selected from the group consisting of chlorosulfonic acid and sulfur trioxide, said process being carried out at a temperature of 0–50° C. thereby forming a hydrocarbon solvent layer and a diphenyl ether sulfonate layer, and separating said layers.

2. A process as described in claim 1 wherein the substituted diphenyl ether is dodecyldiphenyl ether.

3. A process as described in claim 1 wherein the substituted diphenyl ether is dodecylchlorodiphenyl ether.

4. A process as described in claim 1 wherein the temperature is 0–20° C.

5. A process as described in claim 1 wherein the solvent is a saturated aliphatic hydrocarbon having 4–20 carbon atoms in the molecule.

6. A process as described in claim 1 wherein about 6–10 volumes of solvent is used per volume of ether.

7. A process for making disodium dodecyldiphenyl ether disulfonate, which process comprises, contacting one mole of dodecyldiphenyl ether dissolved in a liquid saturated aliphatic hydrocarbon solvent having 4–20 carbon atoms in the molecule with a gaseous mixture comprising 2.0–2.6 moles of sulfur trioxide and an inert gas at a temperature of 0–50° C. for a period of time sufficient to effect substantially complete reaction, separating the hydrocarbon solvent layer from the reaction mixture, neutralizing the remaining reaction product with aqueous sodium hydroxide, and recovering the thus formed disodium dodecyldiphenyl ether disulfonate.

8. A process as described in claim 7 wherein the process is carried out as a continuous process.

References Cited in the file of this patent

UNITED STATES PATENTS 2,691,040  Bloch et al. _____ Oct. 5, 1954

FOREIGN PATENTS 818,243  Great Britain _____ Aug. 12, 1959

UNITED STATES PATENT OFFICE
CERTIFICATE OF CORRECTION

Patent No. 3,127,441                                March 31, 1964

Joseph C. Valenta et al.

It is hereby certified that error appears in the above numbered patent requiring correction and that the said Letters Patent should read as corrected below.

Column 1, lines 13 to 18, and column 5, lines 5 to 8, the formulas, each occurrence, should appear as shown below instead of as in the patent:

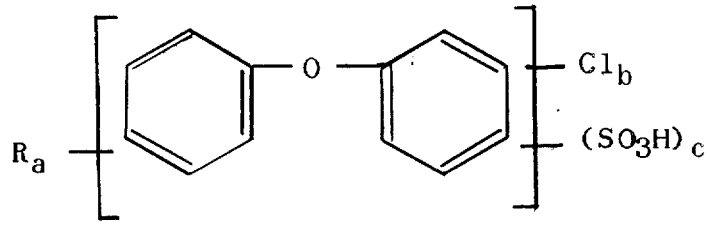

column 1, line 32, for "dephenyl" read -- diphenyl --.

Signed and sealed this 10th day of November 1964.

(SEAL)
Attest:

ERNEST W. SWIDER                                    EDWARD J. BRENNER
Attesting Officer                                  Commissioner of Patents